US011144690B2

(12) United States Patent
Wang et al.

(10) Patent No.: US 11,144,690 B2
(45) Date of Patent: Oct. 12, 2021

(54) EXTENSIBLE LAYER MAPPING FOR IN-DESIGN VERIFICATION

(71) Applicant: Synopsys, Inc., Mountain View, CA (US)

(72) Inventors: Jun Wang, Shanghai (CN); Yun-Jui Li, Shanghai (CN); Bin Xu, Shanghai (CN); Cheng-Ming Wu, Hsinchu (TW); Yu Fan Lu, Kaohsiung (TW); Hu Cai, Shanghai (CN); Yuting Fu, Hsinchu (TW); Hwei-Tseng Wang, Hsinchu (TW); Sui Zheng, Shanghai (CN); Jeong-Tyng Li, Saratoga, CA (US)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 16/719,531

(22) Filed: Dec. 18, 2019

(65) Prior Publication Data

US 2020/0202061 A1  Jun. 25, 2020

(30) Foreign Application Priority Data

Dec. 19, 2018 (CN) .......................... 201811566753.3

(51) Int. Cl.
*G06F 30/33* (2020.01)
*G06F 30/327* (2020.01)
*G06F 30/392* (2020.01)

(52) U.S. Cl.
CPC .......... *G06F 30/327* (2020.01); *G06F 30/392* (2020.01)

(58) Field of Classification Search
CPC ...... G06F 30/398; G06F 30/367; G06F 30/39; G06F 2119/18; G06F 2119/12; G06F 30/392; G06F 30/327; G06F 30/30; G06F 30/33; G06F 30/394; G06F 2111/04; G06F 2111/08; G06F 30/20; G06F 2119/06; G06F 30/3312; G06F 2119/10; G06F 30/13; G06F 30/3323; G06F 17/18; G06F 2111/10; G06F 2111/20; G06F 2119/08; G06F 30/00; G06F 30/35; G06F 30/396; G06F 2115/06;

(Continued)

(56) References Cited

U.S. PATENT DOCUMENTS

| 2011/0173582 | A1* | 7/2011 | Bhattacharya | ........ G06F 30/398 716/106 |
| 2016/0342728 | A1* | 11/2016 | Gibson | ................ G06F 30/398 |
| 2019/0220552 | A1* | 7/2019 | Koranne | ............... G06F 30/327 |

* cited by examiner

*Primary Examiner* — Binh C Tat
(74) *Attorney, Agent, or Firm* — Park, Vaughan, Fleming & Dowler LLP; Laxman Sahasrabuddhe

(57) ABSTRACT

Techniques and systems for implementing a general extensible layer mapping approach that maps between integrated circuit (IC) design database layers and process layers are described. A first IC design layout having in-design layers can be converted into a second IC design layout having derived layers, wherein said converting comprises mapping the in-design layers to the derived layers by applying a set of layer derivation rules to shapes in the IC design layout, and wherein the set of layer derivation rules implements a one-to-many mapping between the in-design layers and the derived layers. Next, a one-to-one mapping between the derived layers and process layers used in a parasitic extraction tool can be generated. Parasitic extraction on the IC design layout then be performed by providing the second IC design layout and the one-to-one mapping to the parasitic extraction tool.

18 Claims, 8 Drawing Sheets

(58) Field of Classification Search
CPC ............... G06F 30/3315; G06F 30/337; G06F 2111/12; G06F 30/23; G06F 30/31; G06F 30/373; G03F 1/70; G03F 7/70433; G03F 7/70466; G03F 7/705; H01L 21/02271
USPC .................................................. 716/100–117
See application file for complete search history.

*conducting_layers*

102 {
| NW | nwell |
|---|---|
| PW | pwell |
| OD | diff |
| PO | poly |
| MD | m0_diff |
| MP | m0_poly |
| M1 | metal1 |
| M2 | metal2 |

*via_layers*

104 {
| CO | contact |
|---|---|
| V1 | via12 |
| V2 | via23 |
| V3 | via34 |

In-design layer mapping file
254

```
* BEGIN LAYER DERIVATION SECTION
* CC_IN_DESIGN  N_POLY  PO  region = sti    type = n
* CC_IN_DESIGN  P_POLY  PO  region = sti    type = n
* CC_IN_DESIGN  N_GATE  PO  region = active type = n
* CC_IN_DESIGN  P_GATE  PO  region = active type = n
* CC_IN_DESIGN  MD_N    MD  type = n
* CC_IN_DESIGN  MD_P    MD  type = p
* END LAYER DERIVATION SECTION
```

N_POLY   n_fpoly
P_POLY   p_fpoly
N_GATE   n_gpoly
P_GATE   p_gpoly
MD_N     n_md
MD_P     p_md

← 262

← 260

Derived layer definition section
256

Derived layer to parasitic extraction tool layer mapping section
258

FIG. 2F

In-design layer mapping file
254

```
* BEGIN OF LAYER DERIVITION SECTION (DO NOT REMOVE)
* CC_IN_DESIGN    N_POLY    PO    region = sti    type = n
* CC_IN_DESIGN    P_POLY    PO    region = sti    type = n
* CC_IN_DESIGN    N_GATE    PO    region = active type = n
* CC_IN_DESIGN    P_GATE    PO    region = active type = n
* CC_IN_DESIGN    MD_N      MD                    type = n
* CC_IN_DESIGN    MD_P      MD                    type = p
* END OF LAYER DERIVITION SECTION N_POLY    n_fpoly
P_POLY    p_fpoly
N_GATE    n_gpoly
P_GATE    p_gpoly
MD_N      n_md
MD_P      p_md
```

Derived layer definition section 256

Derived layer to parasitic extraction tool layer mapping section 258

Parasitic extraction tool

Perform parasitic extraction 354

Map in-design layers to derived layers by using derivation rules specified in the derived layer definition section, and map the derived layers to the parasitic extraction tool layers by using the mapping specified in the derived layer to parasitic extraction tool layer mapping section
352

FIG. 3B

EXTENSIBLE LAYER MAPPING FOR IN-DESIGN VERIFICATION

RELATED APPLICATION

This application claims priority, under 35 U.S.C. § 119(a), to Chinese Provisional Patent Application Ser. No. 201811566753.3, filed on 19 Dec. 2018, the contents of which are herein incorporated by reference in their entirety for all purposes.

COPYRIGHT NOTICE

The assignee of this patent document does not object to the facsimile reproduction of the patent document as it appears in the files of the United States Patent and Trademark Office, but otherwise reserves all rights whatsoever in any included works of authorship protected by copyright.

BACKGROUND

Technical Field

This disclosure relates to integrated circuit (IC) design. More specifically, this disclosure relates to extensible layer mapping for in-design verification.

Related Art

Advances in process technology have fueled a rapid increase in the size and complexity of IC designs. This dramatic increase in complexity and integration densities has made it considerably more challenging to design ICs. In particular, with the advance of semiconductor technology, accurate analysis of parasitic electrical effects of interconnections, such as parasitic resistances, parasitic capacitances, and electro-migration, has become increasingly critical in verifying IC designs.

SUMMARY

This section is not intended to limit the scope of the disclosed subject matter. The disclosed subject matter is to be accorded the widest scope consistent with the principles and features disclosed in the entire disclosure. Some embodiments described herein provide systems and techniques that can be used for verifying an IC design. In particular, some embodiments described herein provide a general extensible layer mapping approach that maps between database layers and process layers, and that can be used in an in-design verification flow to improve circuit design efficiency and decrease verification cost.

Some embodiments provide techniques and systems for in-design parasitic extraction that comprise: (1) converting a first IC design layout having in-design layers into a second IC design layout having derived layers, wherein converting comprises mapping the in-design layers to the derived layers by applying a set of layer derivation rules to shapes in the IC design layout, and wherein the set of layer derivation rules implements a one-to-many mapping between the in-design layers and the derived layers, (2) generating a one-to-one mapping between the derived layers and process layers used in a parasitic extraction tool, and (3) performing parasitic extraction on the IC design layout by providing the second IC design layout and the one-to-one mapping to the parasitic extraction tool.

In some embodiments, the set of layer derivation rules are specified in a layer mapping file, wherein applying the set of layer derivation rules to the shapes in the IC design layout comprises reading the layer mapping file and processing the set of layer derivation rules contained in the layer mapping file. In these embodiments, generating the one-to-one mapping between the derived layers and the process layers used in the parasitic extraction tool comprises creating a temporary file that contains a table that maps derived layers to corresponding process layers, wherein providing the one-to-one mapping to the parasitic extraction tool comprises providing the temporary file to the parasitic extraction tool.

In some embodiments, the set of layer derivation rules are specified in a first section of a layer mapping file, and wherein applying the set of layer derivation rules to the shapes in the IC design layout comprises reading the layer mapping file and processing the first section of the layer mapping file, wherein generating the one-to-one mapping between the derived layers and the process layers used in the parasitic extraction tool comprises creating a second section in the layer mapping file that contains a table that maps derived layers to corresponding process layers. In these embodiments, providing the one-to-one mapping to the parasitic extraction tool comprises providing the layer mapping file to the parasitic extraction tool, wherein the first section of the layer mapping file includes a keyword that causes the parasitic extraction tool to ignore the first section of the layer mapping file.

Each layer derivation rule can include (1) an in-design layer identifier, (2) a process layer identifier, and (3) a condition that must be satisfied by parameters of a given shape in the IC design layout for the layer derivation rule to apply to the given shape. Specifically, a condition in a derivation rule can include one or more of: a first term that checks if the given shape is in an active or a non-active region, a second term that checks if the given shape is in an n-type or a p-type region, and a third term that checks if the given shape is covered by a recognition layer corresponding to a type of module. The type of module can be one of: an input/output module, a low voltage module, a high voltage module, or a memory module.

BRIEF DESCRIPTION OF THE FIGURES

FIG. 2F illustrates an example of an in-design layer mapping file in accordance with some embodiments described herein.

FIGS. 3A-3B illustrate in-design parasitic reporting flow in accordance with some embodiments described herein.

DETAILED DESCRIPTION

Figures 1, 2A:
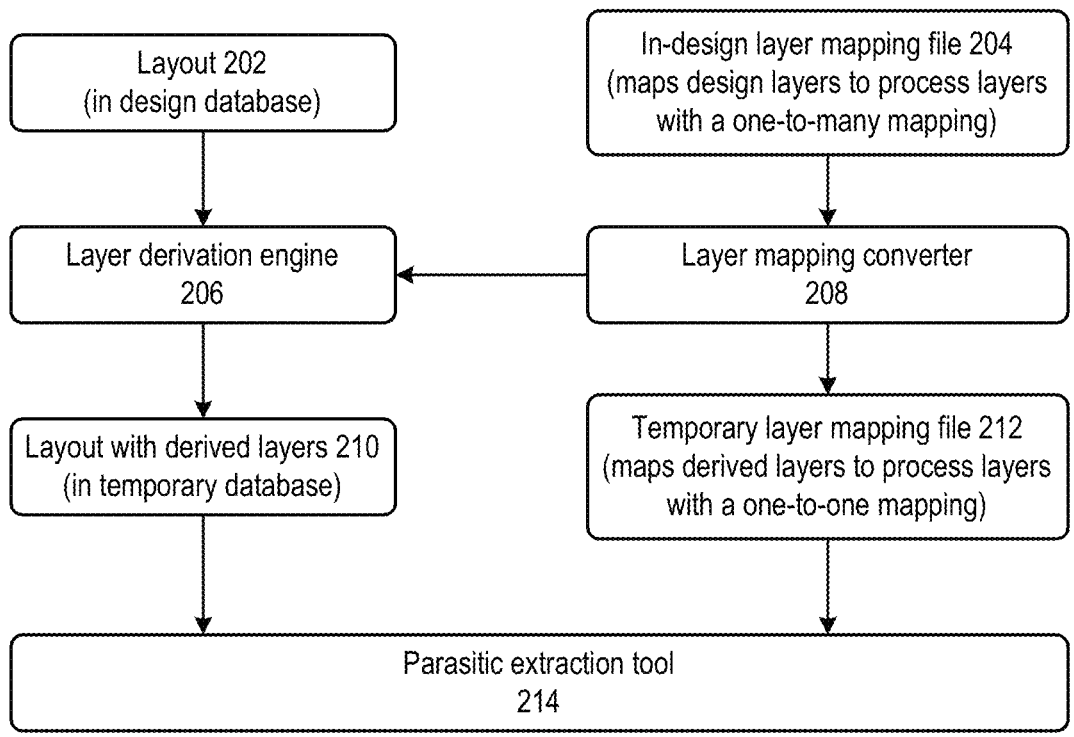
FIG. 1 illustrates an example of a layer mapping file in accordance with some embodiments described herein.
FIG. 2A illustrates a block diagram in accordance with some embodiments described herein.

The following description is presented to enable any person skilled in the art to make and use the claimed invention(s), and is provided in the context of particular application(s) and/or environment(s). Various modifications to the disclosed embodiments will be readily apparent to those skilled in the art, and the general principles defined herein may be applied to other embodiments and applications without departing from the spirit and scope of the disclosure. Thus, the disclosed subject matter is not limited to the embodiments shown, but is to be accorded the widest scope consistent with the principles and features disclosed herein.

In this disclosure, numerous specific details may be described to enable one or more of the embodiments. In the interest of not obscuring the presentation of the embodiments, some features that are known in the art may be combined together, may be described in less detail, or may be implied (i.e., some well-known features may not be explicitly described). Furthermore, while this description may refer to some features in the singular tense, more than one instance of the feature may be illustrated in the figures, and like components are labeled with like numerals.

An IC design and manufacturing process produces IC chips. IC design software tools can be used to create an IC design. Once the IC design is finalized, it can undergo fabrication, packaging, and assembly to produce IC chips. The overall IC design and manufacturing process can involve multiple entities, e.g., one company may create the software for designing ICs, another company may use the software to create the IC design, and yet another company may manufacture IC chips based on the IC design. An IC design flow can include multiple steps, and each step can involve using one or more IC design software tools. An improvement to one or more of these steps in the IC design flow results in an improvement to the overall IC design and manufacturing process. Specifically, the improved IC design and manufacturing process can produce IC chips with a shorter time-to-market (TTM) and/or higher quality of results.

As an IC design progresses through an IC design flow, the IC design can be represented at different levels of abstraction by using different data formats or languages. In general, higher levels of abstraction contain fewer details of the IC design than lower levels of abstraction. Typically, the IC design is described at a high level of abstraction in the early stages of the IC design flow, and the level of abstraction becomes progressively lower as the IC design moves through the IC design flow (i.e., the description of the IC design becomes more specific as the IC design progresses through the IC design flow).

For example, toward the beginning of the IC design flow, an IC design can be described at a high level of abstraction by using a hardware description language (HDL) which describes the functionality of the IC design but does not include information about the actual geometric shapes that will be printed on the wafer. Toward the end of the IC design flow, the same IC design can be represented in a low level of abstraction by using a data format or language such as GDSII or OASIS, which contains a description of the actual geometric shapes that are to be printed on the wafer. In between these two ends of the IC design flow, the IC design may be represented in numerous data formats or languages that describe the same IC design at different levels of abstraction.

Some examples of IC design steps and the associated software tools are described below. These examples are for illustrative purposes only and are not intended to limit the embodiments to the forms disclosed. This disclosure describes techniques and systems that can be used in one or more IC design steps.

IC design software tools enable IC designers to describe the functionality that the IC designers want to implement. These tools also enable IC designers to perform what-if planning to refine functionality, check costs, etc. During logic design and functional verification, the HDL, e.g., SystemVerilog, code can be written and the design can be checked for functional accuracy, e.g., the design can be checked to ensure that it produces the correct outputs.

During synthesis and design for test, the HDL code can be translated to a netlist using one or more IC design software tools. Further, the netlist can be optimized for the target technology, and tests can be designed and implemented to check the finished chips. During netlist verification, the netlist can be checked for compliance with timing constraints and for correspondence (i.e., equivalence checking) with the RTL design and/or HDL code.

During design planning, an overall floorplan for the chip can be constructed and analyzed for timing and top-level routing. During physical implementation, circuit elements can be positioned in the layout and can be electrically connected.

During analysis and extraction, the IC design's functionality can be verified at a transistor level and parasitics can be extracted. During physical verification, the design can be checked to ensure correctness for manufacturing, electrical issues, lithographic issues, and circuitry.

During resolution enhancement, geometric manipulations can be performed on the layout to improve manufacturability of the design. During mask data preparation, the design can be "taped out" to produce masks which are used during fabrication.

For a given semiconductor manufacturing process, foundries provide parasitic parameters for each process layer. To check the parasitics for a shape in the user database, the shape's process layer needs to be known, so that the appropriate parasitic parameters can be looked up based on the process layer name by using the foundry-provided parasitic parameters files. Typically, parasitic extraction tools use a one-to-one layer mapping file to map a layer in the completed IC design that is ready for sign-off to a process layer. However, the one-to-one layer mapping file that is available at sign-off is not available when the IC design is still being designed. Further details on parasitic extraction can be found in U.S. Pat. Nos. 8,769,462, 10,372,867, and 10,482,212, which are herein incorporated by reference in their entirety for all purposes.

FIG. 1 illustrates an example of an in-design layer mapping file in accordance with some embodiments described herein. The terms "conducting_layers" and "via_layers" are keywords identifying whether layers shown below those terms are conducting layers or via layers. Specifically, in FIG. 1, lines 102 correspond to conducting layers and lines 104 correspond to via layers. Each line maps a user database identifier to a layer, where the first element (e.g., NW, PW, etc.) in the line is a user database layer identifier and the second element (e.g., nwell, pwell, etc.) in the line is an explanation of what the identifier represents. This layer mapping syntax is used in semiconductor design flow for parasitic checks before design sign-off.

Process layers that are used in a semiconductor fabrication process do not have a one-to-one relationship with design database layers. For example, a "POLY" layer in design database may include shapes on multiple process layers (sometimes tens of different process layers). In existing techniques, parasitic checks cannot be applied in-design because design layers cannot be mapped to process layers directly. In existing sign-off design flow, after the whole design layout is finished, a layout-versus-schematic (LVS) step is added before parasitic checks. In the LVS step, circuit layout in the design database (e.g., OpenAccess database) is converted into a database (e.g., Milkyway database) which has design layers that have a one-to-one mapping to process layers, so that the layer mapping approach can be applied on the Milkyway database, and parasitic checks can be performed. However, because LVS can only be implemented after a design is completed, this approach cannot be applied for in-design parasitic checks. The term "in-design" refers to a point in the design flow when the IC design has not been completed and the IC design is not ready for performing an LVS step.

In particular, some embodiments described herein are used during custom analog design. Specifically, a portion of an analog design (e.g., a set of transistors with interconnections) may be designed and interconnected. At this point in the IC design flow, the IC design is not complete, but the user may want to check if this analog portion of the IC design operates as expected. Specifically, the user may want to calculate a set of waveforms by simulating the circuit based on a given set of input waveforms. To do this successfully, the tool needs to accurately determine parasitics (resistance, capacitance, etc.) for the analog portion of the IC design. The user is not able to use the standard LVS tools to extract parasitics because the standard LVS tools can only be used after the design has been completed, which is not the case in the above-mentioned scenario. Embodiments described herein can be used in such scenarios. In particular, embodiments described herein can determine the process layers that are expected to be used based on applying layer mapping rules to information that is available during design. The details of how embodiments use these rules to accurately map a given design layer to one of a plurality of process layers are described in further detail below.

With the advance of semiconductor technology and increasing of circuit scale, in most cases it is too late to check and fix parasitic errors after a whole design is finished. Designers might need to re-design the layout from very beginning and they may need several such iterations to make a design clean of parasitic errors. This leads to long turn-around-times for analog designs. More and more circuit designers are feeling the need for performing an in-design parasitic check so that they can verify and correct parasitic issues earlier in the design cycle. Therefore, there is a need for a layer mapping approach that maps design database layers to process layers directly to enable in-design parasitic checks.

Some embodiments described herein provide a general layer mapping syntax and flow by which design database layers can be mapped to process layers directly, and in-design circuit parasitic checks can be enabled before a circuit design is finished.

FIG. 2A illustrates a block diagram in accordance with some embodiments described herein. Layout 202 is the layout as stored in the design database, i.e., it is the in-design layout, and not the completed IC design layout. In particular, layout 202 in the design database can correspond to analog circuitry that is being designed using a custom design tool. In-design layer mapping file 204 can be used to map design layers to process layers. In some embodiments, the in-design layer mapping file 204 includes not only layer mapping information, but also layer derivation rules. In-design layer mapping file 204 implements a one-to-many mapping between design layers and process layers that are used by a parasitic extraction tool. In-design layer mapping file 204 can be provided to layer mapping converter 208, which can process the file and create a set of derived layers that the design layers are mapped. Layer mapping converter 208 can provide the derivation rules and the derived layers to layer derivation engine 206. Layer derivation engine 206 can convert layout 202 into layout with derived layer 210 that is stored in a temporary database. Layer mapping converter 208 can also create a temporary layer mapping file 212 that provides a one-to-one mapping between the derived layers and the process layers. Next, parasitic extraction tool 214 can read the layout with derived layers 210 and temporary layer mapping file 212, and extract parasitics for layout 202. The extracted parasitics can then be returned to the design tool, which can use the parasitics to calculate or simulate voltages and/or currents in layout 202.

In particular, the layer mapping rules can have the following syntax: "design_layer_name process_layer_name layer_derivation_rule." This mapping syntax allows the same design layer to be mapped to different process layers by specifying different layer derivation rules for each process layer.

In some embodiments, the layer mapping syntax can include logical operators, such as AND, NOT, etc. Examples of layer mapping rules using this syntax are shown below:

| poly | n_gate_poly | poly AND n-implant AND od |
| poly | p_gate_poly | poly AND p-implant AND od |
| poly | n_field_poly | poly AND n-implant AND NOT od |
| poly | p_field_poly | poly AND p-implant AND NOT od |

In the above example, "poly" is a design database layer identifier and "n_gate_poly," "p_gate_poly," "n_field_poly," and "p_field_poly" are four distinct process layer identifiers that are derived from the same "poly" design database layer based on satisfying the conditions specified in the rules. In the above example, three design database layers "od," "n_implant," and "p-implant" are used in the layer derivation rules to determine which process layer to map the "poly" layer to.

In some embodiments, layer derivations can be determined based on the following arguments: (1) active or isolation region, (2) n-type or p-type region, and (3) a region covered by a recognition layer. A recognition layer is a layer in the IC design tool that specifies regions with different voltages or currents; specifically, impurity implantation of different dopants/dosages is additionally performed for these regions, which leads to different resistance, capacitance, and electro-migration characteristics. Further details on recognition layers can be found in U.S. Pat. No. 6,606,735, which is herein incorporated by reference in its entirety for all purposes.

Figure 2B:
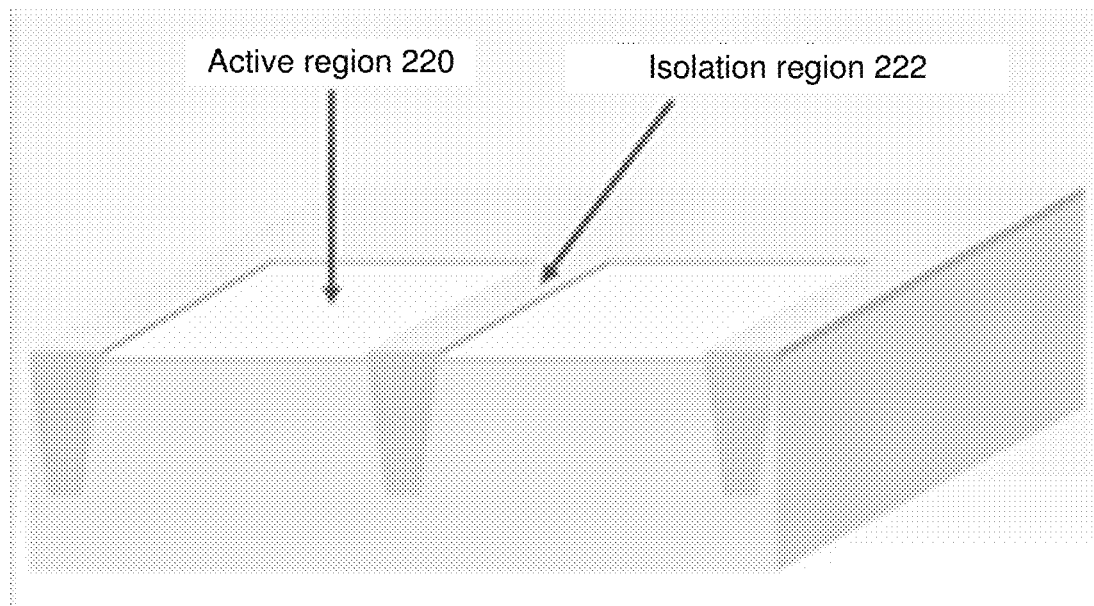
FIGS. 2B-2D illustrate layers that can be used in layer derivation rules in accordance with some embodiments described herein.
Figure 2C:
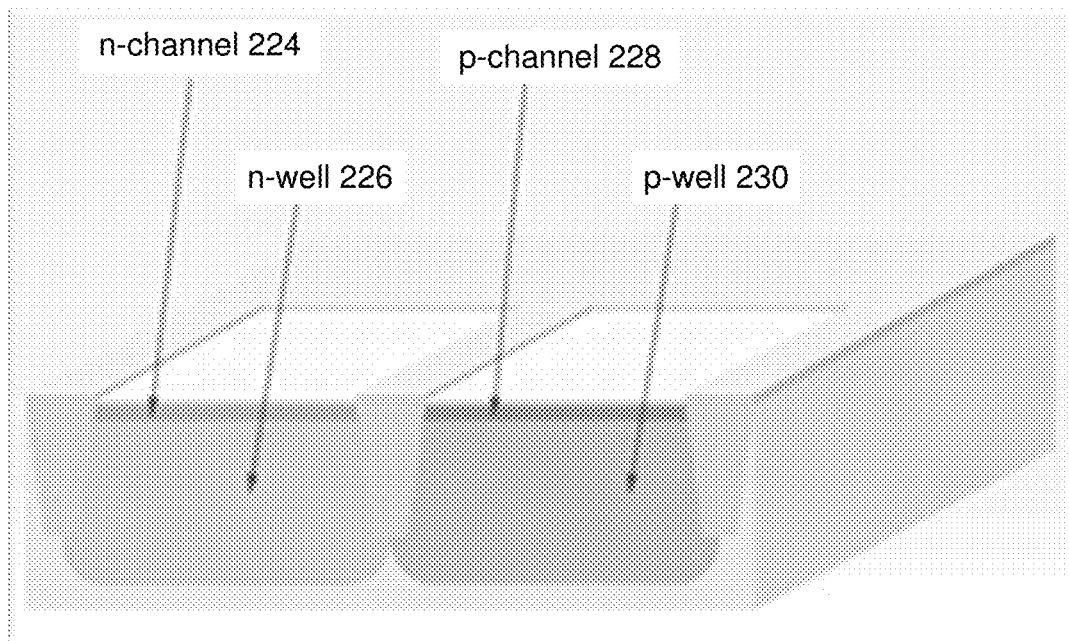
Figure 2D:
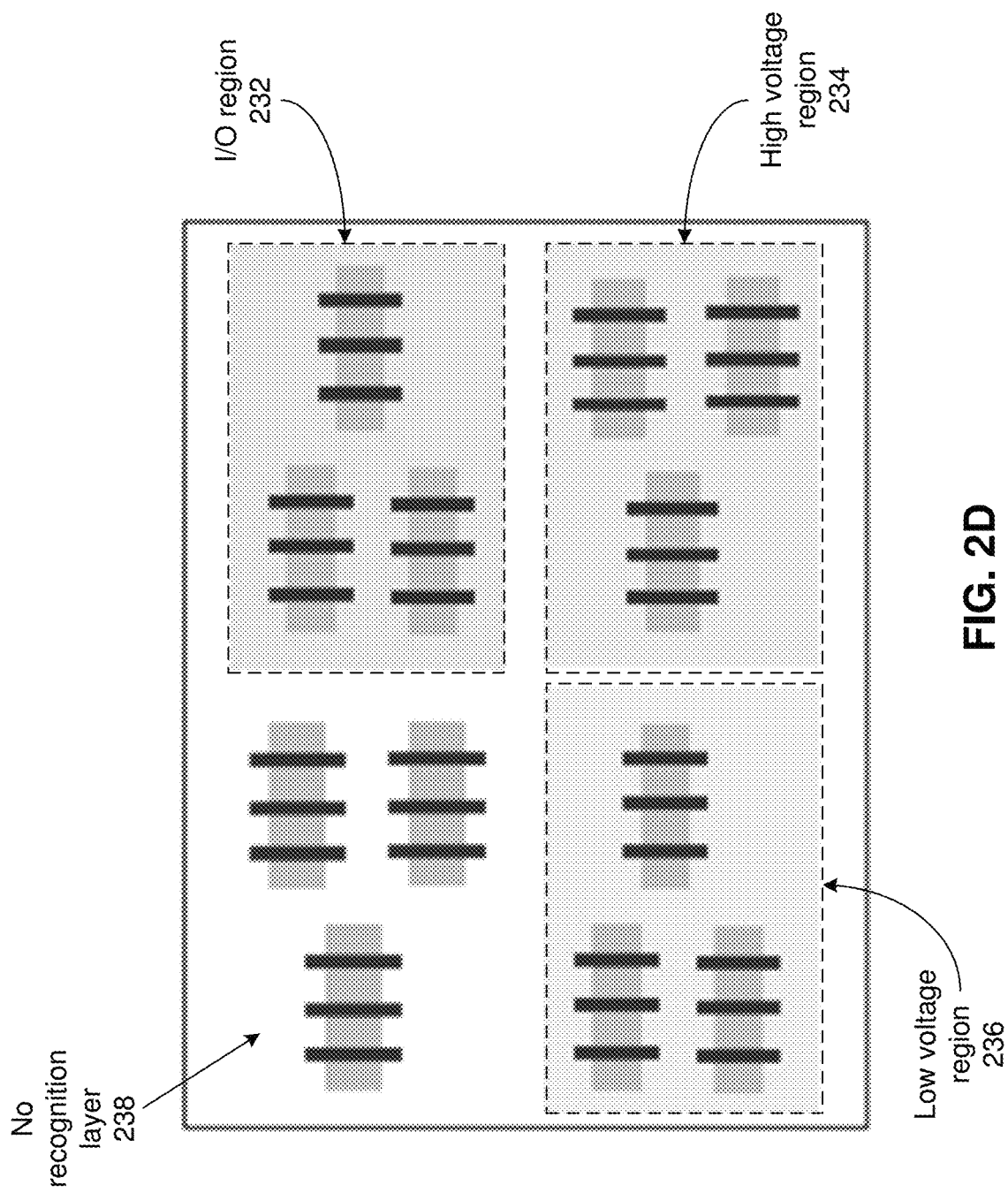

FIGS. 2B-2D illustrate layers that can be used in layer derivation rules in accordance with some embodiments described herein. FIG. 2B illustrates active region 220 that corresponds to an active component (e.g., a transistor), and isolation region 222 that is used to isolate active regions from each another. FIG. 2C illustrates n-channel 224, n-well 226, p-channel 228, and p-well 230. FIG. 2D illustrates I/O region 232 that includes circuitry for performing input/output functions, high-voltage region 234 that includes circuitry that is expected to have high voltages, and low-voltage region 236 that includes circuitry that is expected to operate at low voltages. The circuitry in region 238 is not covered by a recognition layer.

Some embodiments can use the syntax shown below, which uses three arguments that were mentioned above (the term "sti" is used in semiconductor industry to represent isolation regions, i.e., non-active regions):

```
design_layer_name process_layer_name
    [region=active|sti] [type=n|p]
    [recognition_layer=layer_name]
```

| Argument | Description |
| --- | --- |
| region | Overlapped with diffusion (active) or outside diffusion (sti) region. If this argument is missing in the rule, then it is interpreted as applying to both active and sti regions. |
| type | Covered by n-type or p-type regions. If this argument is missing in the rule, then it is interpreted as applying to both n-type and p-type regions. |
| recognition_layer | Covered by recognition layers for specific modules. Examples of recognition layers include: I/O, low_voltage, high_voltage, or memory modules. If this argument is missing in the rule, then it is interpreted as applying to all recognition layers. |

Figure 2E:
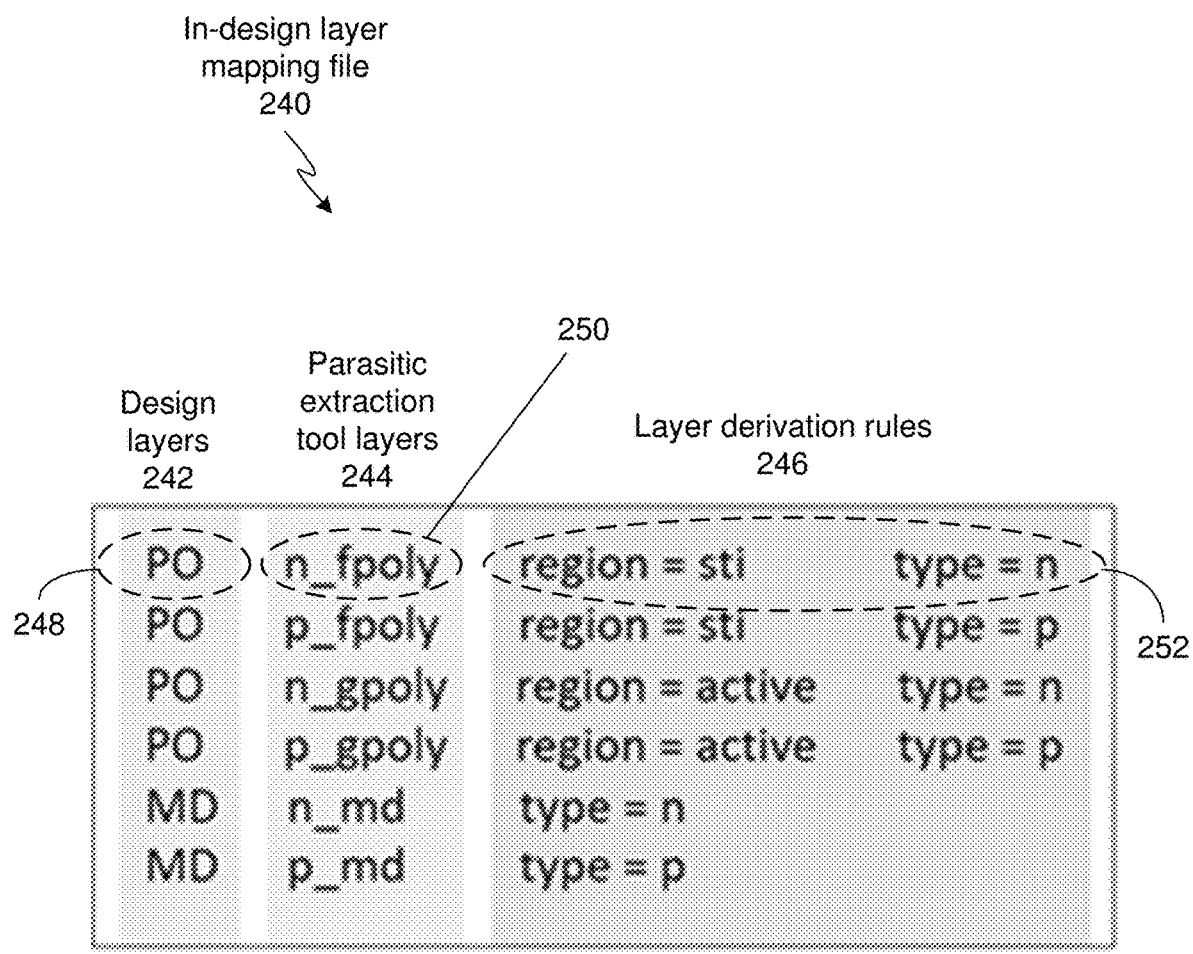
FIG. 2E illustrates an example of an in-design layer mapping file in accordance with some embodiments described herein.

FIG. 2E illustrates an example of an in-design layer mapping file in accordance with some embodiments described herein. In-design layer mapping file 240 includes three columns: (1) design layers 242, (2) parasitic extraction tool layers 244, and (3) layer derivation rules 246. Design layers 242 contains layers in the design database. The layer derivation rules 246 contain the layer derivation rules that map the layers in the design database to the process layers that will be used to extract parasitics. Parasitic extraction tool layers 244 specifies the layer that the design layer is mapped to when the corresponding layer derivation rule is matched.

For example, identifier "PO" 248 refers to the polysilicon layer in the design database, the condition "region=sti type=n" 252 represents a n-type field poly in process layers, and "n_fpoly" 250 is the process layer identifier that design layer identifier "PO" is mapped to when the condition "region=sti type=n" is satisfied by a shape in the IC design database. Note that design layer "PO" can map to four different parasitic extraction tool layers: "n_fpoly," "p_fpoly," "n_gpoly," and "p_gpoly."

FIG. 2F illustrates an example of an in-design layer mapping file in accordance with some embodiments described herein. In-design layer mapping file 254 includes a derived layer definition section 256 and a derived layer to parasitic extraction tool layer mapping section 258. Derived layer definition section 256 contains the derivation rules that are applied to the shapes in the design database, and are mapped to a derived layer (e.g., derived layers 260). Next, the derived layers (e.g., derived layers 260) are mapped to the parasitic extraction tool layers (e.g., parasitic extraction tool layers 262) by using the derived layer to parasitic extraction tool layer mapping section 258.

Figure 3A:
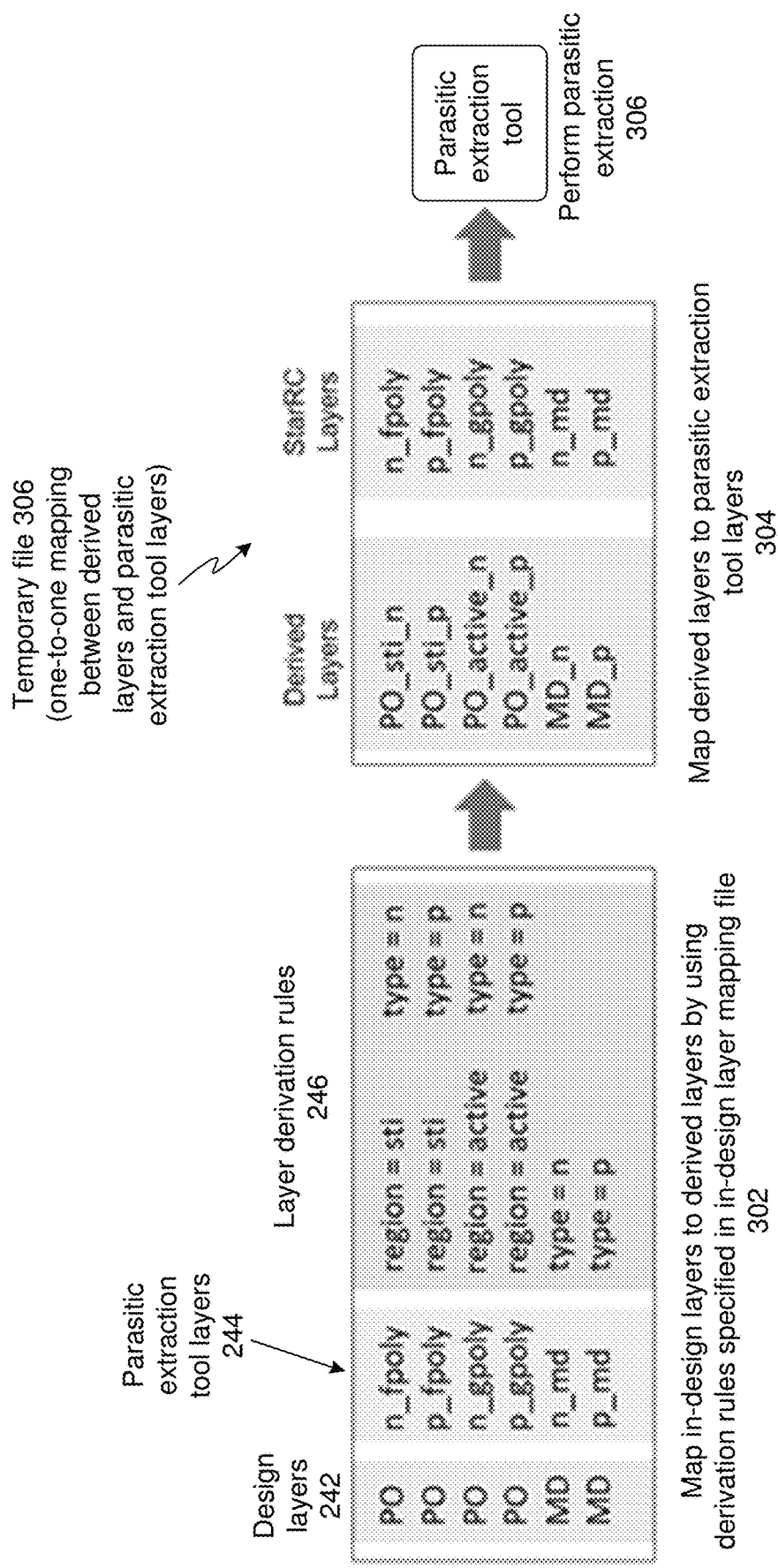

FIGS. 3A-3B illustrate in-design parasitic reporting flow in accordance with some embodiments described herein. The embodiments shown in FIGS. 3A-3B read the layout in the design database, and the in-design layer mapping file. Next, the embodiments report the extracted parasitics that are computed by sign-off parasitic extraction tools, such as StarRC™, which is considered by many to be the industry's gold standard for parasitic extraction.

In FIG. 3A, the embodiment can map in-design layers to derived layers by using derivation rules specified in in-design layer mapping file (step 302). Next, the embodiment can map derived layers to parasitic extraction tool layers (step 304). Finally, parasitic extraction can be performed (step 306).

Some parasitic extraction tools only support a one-to-one mapping relationship between the layers outputted by the sign-off tool and the process layers that are going to be used during semiconductor fabrication. Therefore, the embodiment shown in FIG. 3A can create temporary file 306 that provides a one-to-one mapping between derived layers and parasitic extraction tool layers. The temporary file can then be provided to the parasitic extraction tool.

In FIG. 3B, the embodiment can map in-design layers to derived layers by using derivation rules specified in the derived layer definition section, and map the derived layers to the parasitic extraction tool layers by using the mapping specified in the derived layer to parasitic extraction tool layer mapping section (step 352). Next, parasitic extraction can be performed (step 354). In this embodiment, layer derivation rules can be defined as comments, and can only be recognized by the in-design tools. In this way, the layer mapping file (shown in FIG. 3B) can have the proper syntax for the parasitic extraction tool (e.g., StarRC™ layer mapping file), and can be fed directly (i.e., without first creating a temporary file as in FIG. 3A) to the parasitic extraction tool. Note that the embodiments can keep a mapping between design database layer names and derived layer names for the parasitic extraction tool, so that it can map the parasitic results produced by the parasitic extraction tool back to the design database layers. In FIG. 3B, the keyword "CC_IN_DESIGN" can indicate that the line contains a layer derivation rule and it is to be used by the mapping tool to map in-design layers to derived layers. The parasitic extraction tool can ignore lines that begin with the keyword "CC_IN_DESIGN."

Figure 4:
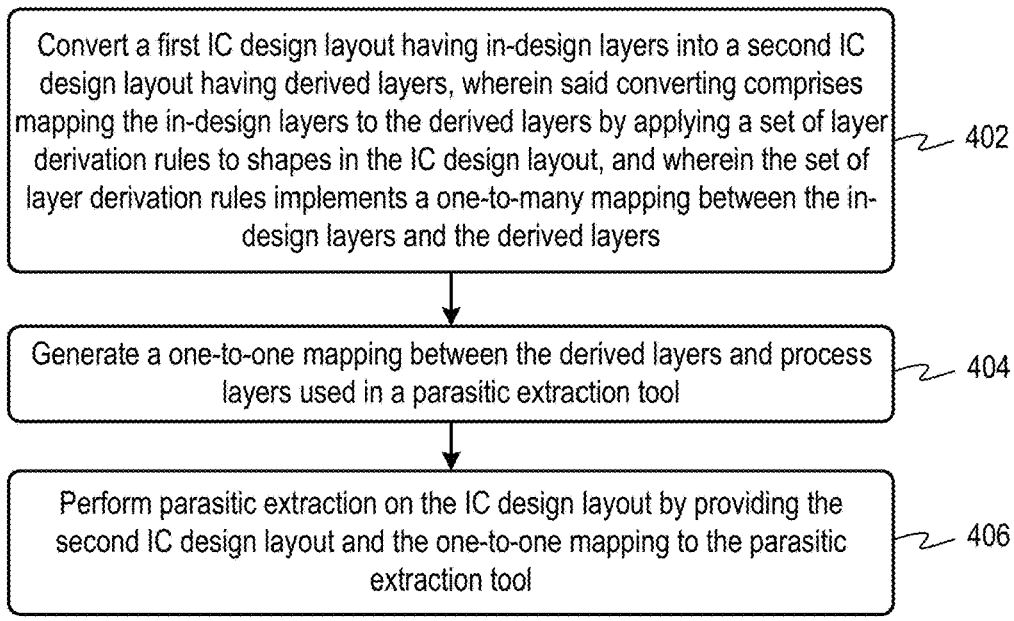
FIG. 4 illustrates a process for mapping design layers to process layers in accordance with some embodiments described herein.

FIG. 4 illustrates a process for mapping design layers to process layers in accordance with some embodiments described herein. The process can begin by converting a first IC design layout having in-design layers into a second IC design layout having derived layers, wherein said converting comprises mapping the in-design layers to the derived layers by applying a set of layer derivation rules to shapes in the IC design layout, and wherein the set of layer derivation rules implements a one-to-many mapping between the in-design layers and the derived layers (step 402). Next, the process can generate a one-to-one mapping between the derived layers and process layers used in a parasitic extraction tool (step 404). The process can then perform parasitic extraction on the IC design layout by providing the second IC design layout and the one-to-one mapping to the parasitic extraction tool (step 406). The extracted parasitic values can then be returned back to the design tool, and the design tool can use the parasitic values that were accurately extracted by the parasitic extraction tool (e.g., StarRC™) to simulate the behavior of the circuitry (e.g., analog circuitry) that is being designed by using the design tool.

In some embodiments, the set of layer derivation rules are specified in a layer mapping file, wherein applying the set of layer derivation rules to the shapes in the IC design layout comprises reading the layer mapping file and processing the rules contained in the layer mapping file. FIG. 2E illustrates an example of a layer mapping file. In these embodiments, generating the one-to-one mapping between the derived layers and the process layers used in the parasitic extraction tool comprises creating a temporary file that contains a table that maps derived layers to corresponding process layers, and wherein providing the one-to-one mapping to the parasitic extraction tool comprises providing the temporary file to the parasitic extraction tool. FIG. 3A illustrates how a temporary file can be created based on a layer mapping file. Specifically, a derived layer can be created for each layer derivation rule. In some embodiments, the name of the derived layer can encode the conditions in the layer derivation rule that are required to be satisfied. For example, the first layer derivation rule in the in-design layer mapping file shown in FIG. 3A requires the "region" argument to be equal to "sti" and the "type" argument to be equal to "n." Therefore, the derived layer corresponding to this rule can be named "PO_sti_n" where "PO" is the identifier of the in-design layer and "sti_n" is a combination of the two argument values specified in the layer derivation rule (the argument values are combined using the separator "_").

In some embodiments, the set of layer derivation rules are specified in a first section of a layer mapping file, wherein applying the set of layer derivation rules to the shapes in the IC design layout comprises reading and processing the layer mapping file. In these embodiments, generating the one-to-one mapping between the derived layers and the process layers used in the parasitic extraction tool comprises creating a second section in the layer mapping file that contains a table that maps derived layers to corresponding process layers. In these embodiments, providing the one-to-one mapping to the parasitic extraction tool comprises providing the layer mapping file to the parasitic extraction tool, wherein the first section of the layer mapping file includes a keyword that causes the parasitic extraction tool to ignore the first section of the layer mapping file. FIG. 2F illustrates an example of a layer mapping file that includes two sections. Derived layer definition section 256 contains the layer mapping rules, and derived layer to parasitic extraction tool layer mapping section 258 contains the one-to-one mapping between the derived layers and the process layers used by the parasitic extraction tool.

In some embodiments, each layer derivation rule includes (1) an in-design layer identifier, (2) a process layer identifier, and (3) a condition that must be satisfied by parameters of a given shape in the IC design layout for the layer derivation rule to apply to the given shape. FIG. 2E illustrates examples of layer derivation rules. Specifically, identifier 248 is an example of an in-design layer identifier, identifier 250 is an example of a process layer identifier, and condition 252 is an example of a condition that must be satisfied for the first rule shown in FIG. 2E to be applied. As shown in FIG. 2E, the condition includes one or more of: a first term that checks if the given shape is in an active or a non-active region (e.g., the "region=sti" term in FIG. 2E), a second term that checks if the given shape is in an n-type or a p-type region (e.g., the "type=n" term in FIG. 2E), and a third term that checks if the given shape is covered by a recognition layer corresponding to a type of module (e.g., "recognition_layer=memory"—this term is not shown in FIG. 2E). The types of modules can include an input/output module, a low voltage module, a high voltage module, or a memory module.

Figure 5:
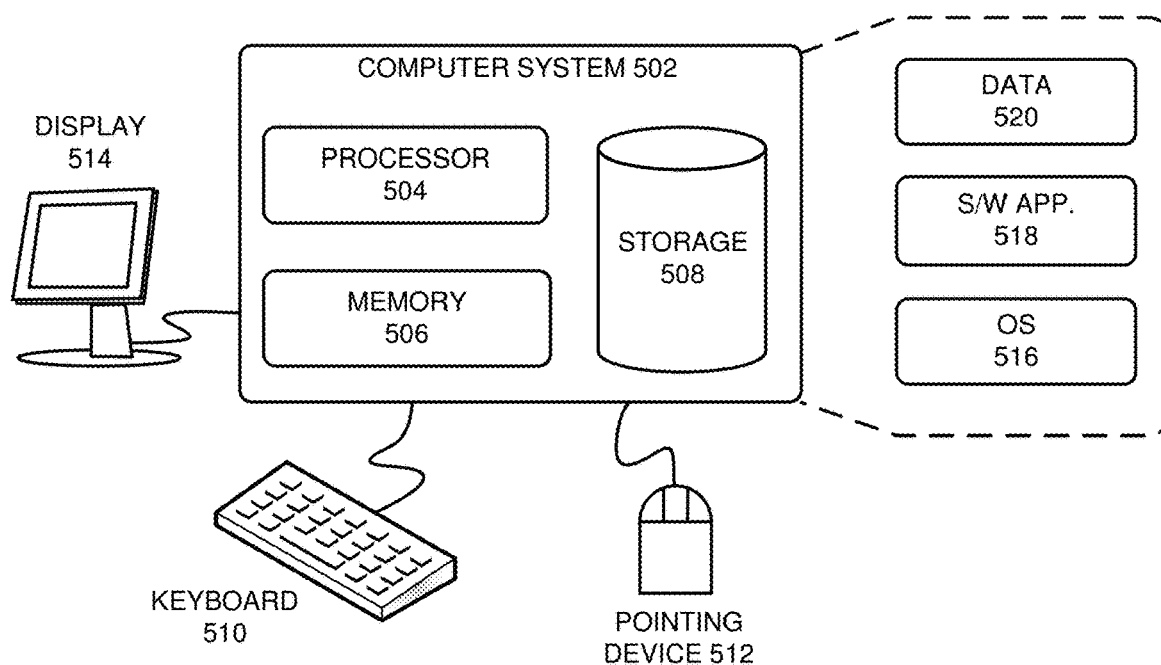
FIG. 5 illustrates a computer system in accordance with some embodiments described herein.

FIG. 5 illustrates a computer system in accordance with some embodiments described herein. The term "computer" or "computer system" generally refers to a hardware-based system that can perform computations required for the design and manufacture of ICs. Computer system 502 can include processor 504, memory 506, and storage device 508. Computer system 502 may include multiple processors, and processor 504 may include multiple cores. Specifically, memory locations in memory 506 can be addressable by processor 504, thereby enabling processor 504 to access (e.g., via load/store instructions) and manipulate (e.g., via logical/floating point/arithmetic instructions) the data stored in memory 506. Computer system 502 can be coupled to display device 514, keyboard 510, and pointing device 512. Storage device 508 can store operating system 516, software application 518, and data 520. Data 520 can include input required by software application 518 and/or output generated by software application 518.

Computer system 502 may automatically (or with user help) perform one or more operations that are implicitly or explicitly described in this disclosure. Specifically, computer system 502 can load software application 518 into memory 506, and software application 518 can then be used to perform in-design parasitic extraction that uses an extensible layer mapping approach to map between in-design layers and process layers used by a sign-off parasitic extraction tool. The resulting IC design is expected to have better performance and/or quality of results (QoR) because the parasitics were accurately extracted by using a sign-off parasitic extraction tool during design.

While 'data' and 'information' often are used interchangeably (e.g., 'data processing' and 'information processing'), the term 'datum' (plural 'data') typically signifies a representation of the value of a measurement of a physical quantity (e.g., the current in a wire), or the answer to a question (e.g., "yes" or "no"), while the term 'information' typically signifies a structured set of data (often times signified by 'data structure'). A specified data structure is used to structure an electronic device to be used as a specific machine as an article of manufacture (see In re Lowry, 32 F.3d 1579 [CAFC, 1994]). Data and information are physical, for example binary data (a 'bit', usually signified with '0' and '1') enabled with two different levels of voltage in a circuit. For example, data can be enabled as an electrical, magnetic, optical or acoustical signal; a quantum state such as spin that enables a 'qubit'; or a physical state of an atom or molecule. All such data and information, when enabled, are stored, accessed, transferred, combined, compared, or otherwise acted upon, actions that require energy.

As used herein, the term 'process' signifies an unnatural sequence of physical actions and/or transformations (both also referred to as 'operations' or 'steps') to produce at least one result. The actions and transformations are technical applications of one or more natural laws of science or unnatural laws of technology. The actions and transformations often change the physical state of a machine, of structures of data and information, or of a composition of matter. Two or more actions can occur at about the same time, or one action can occur before or after another action, if they produce the same result. A description of the physical actions and/or transformations that comprise a process are often signified with a set of gerund phrases (or their semantic equivalents) that are typically preceded with the signifier 'the steps of' (e.g., "a process comprising the steps of measuring, transforming, partitioning and then distributing . . . "). The signifiers 'algorithm', 'method', 'procedure', '(sub)routine', 'protocol', 'recipe', and 'technique' often are used interchangeably with 'process', and 35 U.S.C. 100 defines a "method" as one type of process that is, by statutory law, always patentable under 35 U.S.C. 101. Many forms of knowledge, learning, skills and styles are authored, structured, and enabled—objectively—as processes—e.g., knowledge and learning as functions in knowledge programming languages. As used herein, the term 'rule' signifies a process with at least one conditional test (signified, e.g., by 'IF test THEN process'). As used herein, the term 'thread' signifies a sequence of operations or instructions that comprise a subset of an entire process. A process can be partitioned into multiple threads that can be used at or about at the same time.

As used herein, the term 'component' (also signified by 'part', and typically signified by 'element' when described in a patent text or diagram) signifies a physical object that is used to enable a process in combination with other components. For example, electronic components are used in processes that affect the physical state of one or more ('ensemble') electromagnetic or quantum particles/waves (e.g., electrons, photons) or quasiparticles (e.g., electron holes, phonons, magnetic domains) and their associated fields or signals. Electronic components have at least two connection points to which are attached 'leads', typically a wire with one end attached to the component and the other end attached to another component, typically as part of a circuit with current flows. There are at least three types of electrical components: passive, active and electromechanical. Passive electronic components typically do not introduce energy into a circuit—such components include resistors, memristors, capacitors, magnetic inductors, crystals, Josephson junctions, transducers, sensors, antennas, waveguides, etc. Active electronic components require a source of energy and can inject energy into a circuit—such components include semiconductors (e.g., diodes, transistors, optoelectronic devices), vacuum tubes, batteries, power supplies, displays (e.g., LEDs, LCDs, lamps, CRTs, plasma displays). Electromechanical components affect current flow using mechanical forces and structures—such components include switches, relays, protection devices (e.g., fuses, circuit breakers), heat sinks, fans, cables, wires, terminals, connectors and printed circuit boards. As used herein, the term 'netlist' is a specification of the components comprising an electric circuit, and electrical connections between the components. The programming language for the SPICE circuit simulation program is often used to specify a netlist. In the context of circuit design, the term 'instance' signifies each time a component is specified in a netlist.

One of the most important components as goods in commerce is the integrated circuit, and its res of abstractions. As used herein, the term 'integrated circuit' signifies a set of connected electronic components on a small substrate (thus the use of the signifier 'chip') of semiconductor material, such as silicon or gallium arsenide, with components fabricated on one or more layers. Other signifiers for 'integrated circuit' include 'monolithic integrated circuit', 'IC', 'chip', 'microchip' and 'System on Chip' ('SoC'). Types of integrated circuits include gate/logic arrays, processors, memories, interface chips, power controllers, and operational amplifiers. The term 'cell' as used in electronic circuit design signifies a specification of one or more components, for example, a set of transistors that are connected to function as a logic gate. Cells are usually stored in a database, to be accessed by circuit designers and design processes.

As used herein, the term 'module' signifies a tangible structure for acting on data and information that typically is limited in size and/or complexity. For example, the term 'module' can signify one or more processes that transforms data and information, for example, processes comprising a computer program. The term 'module' also can signify one or more interconnected electronic components, such as digital logic devices. A process comprising a module, if specified in a programming language, such as System C or Verilog, also can be transformed into a specification for a structure of electronic components that transform data and information that produce the same result as the process. This last sentence follows from a modified Church-Turing thesis, which is simply expressed as "Whatever can be transformed by a (patentable) process and a processor, can be transformed by a (patentable) equivalent set of modules.", as opposed to the doublethink of deleting only one of the "(patentable)".

A module is permanently structured (e.g., circuits with unalterable connections), temporarily structured (e.g., circuits or processes that are alterable with sets of data), or a combination of the two forms of structuring. Permanently structured modules can be manufactured, for example, using Application Specific Integrated Circuits ('ASICs') such as Arithmetic Logic Units ('ALUs'), Programmable Logic Arrays ('PLAs'), or Read Only Memories ('ROMs'), all of which are typically structured during manufacturing. For example, a permanently structured module can comprise an integrated circuit. Temporarily structured modules can be manufactured, for example, using Field Programmable Gate Arrays (FPGAs—for example, sold by Xilink or Intel's Altera), Random Access Memories (RAMs) or microprocessors. For example, data and information is transformed using data as an address in RAM or ROM memory that stores output data and information. One can embed temporarily structured modules in permanently structured modules (for example, a FPGA embedded into an ASIC).

Modules that are temporarily structured can be structured during multiple time periods. For example, a processor comprising one or more modules has its modules first structured by a manufacturer at a factory and then further structured by a user when used in commerce. The processor can comprise a set of one or more modules during a first time period, and then comprise a different set of one or modules during a second time period. The decision to manufacture or implement a module in a permanently structured form, in a temporarily structured form, or in a combination of the two forms, depends on issues of commerce such as cost, time considerations, resource constraints, tariffs, maintenance needs, national intellectual property laws, and/or specific design goals. How a module is used is mostly independent of the physical form in which it is manufactured or enabled. This last sentence also follows from the modified Church-Turing thesis.

As used herein, the term 'processor' signifies a tangible data and information processing machine for use in commerce that physically transforms, transfers, and/or transmits data and information, using at least one process. A processor consists of one or more modules (e.g., a central processing unit, 'CPU'; an input/output ('I/O') controller, a memory controller, a network controller, and other modules). The term 'processor' can signify one or more processors, or one or more processors with multiple computational cores/CPUs, specialized processors (for example, graphics processors or signal processors), and their combinations. Where two or more processors interact, one or more of the processors can be remotely located. Where the term 'processor' is used in another context, such as a 'chemical processor', it will be signified and defined in that context.

The processor can comprise, for example, digital logic circuitry (for example, a binary logic gate), and/or analog circuitry (for example, an operational amplifier). The processor also can use optical signal processing, DNA transformations or quantum operations, microfluidic logic processing, or a combination of technologies, such as an optoelectronic processor. For data and information structured with binary data, any processor that can transform data and information using the AND, OR and NOT logical operations (and their derivatives, such as the NAND, NOR, and XOR operations) also can transform data and information using any function of Boolean logic. A processor such as an analog processor, such as an artificial neural network, also can transform data and information. No scientific evidence exists that any of these technological processors are processing, storing and retrieving data and information, using any process or structure equivalent to the bioelectric structures and processes of the human brain.

The one or more processors also can use a process in a 'cloud computing' environment, where time and resources of multiple remote computers are shared by multiple users or processors communicating with the computers. For example, a group of processors can use at least one process available at a distributed or remote system, these processors using a communications network (e.g., the Internet, or an Ethernet) and using one or more specified interfaces (e.g., an application program interface ('APP') that signifies functions and data structures to communicate with the remote process).

As used herein, the term 'computer' and 'computer system' (further defined below) includes at least one processor that, for example, performs operations on data and information such as (but not limited to) the AND, OR and NOT logical operations using electronic gates that can comprise transistors, with the addition of memory (for example, memory structured with flip-flops using the NOT-AND or NOT-OR operation). Such a processor is Turing-complete and computationally universal. A computer can comprise a simple structure, for example, comprising an I/O module, a CPU, and a memory that performs, for example, the process of inputting a signal, transforming the signal, and outputting the signal with no human intervention.

As used herein, the term 'programming language' signifies a structured grammar for specifying sets of operations and data for use by modules, processors and computers. Programming languages include assembler instructions, instruction-set-architecture instructions, machine instructions, machine dependent instructions, microcode, firmware instructions, state-setting data, or either source code or object code written in any combination of one or more higher level languages, for example, the C programming language and similar general programming languages (such as Fortran, Basic, Javascript, PHP, Python, C++), knowledge programming languages (such as Lisp, Smalltalk, Prolog, or CycL), electronic structure programming languages (such as VHDL, Verilog, SPICE or SystemC), text programming languages (such as SGML, HTML, or XML), or audiovisual programming languages (such as SVG, MathML, X3D/VRML, or MIDI), and any future equivalent programming languages. As used herein, the term 'source code' signifies a set of instructions and data specified in text form using a programming language. A large amount of source code for use in enabling any of the claimed inventions is available on the Internet, such as from a source code library such as Github.

As used herein, the term 'program' (also referred to as an 'application program') signifies one or more processes and data structures that structure a module, processor or computer to be used as a "specific machine" (see In re Alappat, 33 F3d 1526 [CAFC, 1991]). One use of a program is to structure one or more computers, for example, standalone, client or server computers, or one or more modules, or systems of one or more such computers or modules. As used herein, the term 'computer application' signifies a program that enables a specific use, for example, to enable text processing operations, or to encrypt a set of data. As used herein, the term 'firmware' signifies a type of program that typically structures a processor or a computer, where the firmware is smaller in size than a typical application program, and is typically not very accessible to or modifiable by the user of a computer. Computer programs and firmware are often specified using source code written in a programming language, such as C. Modules, circuits, processors, programs, and computers can be specified at multiple levels of abstraction, for example, using the SystemC programming language, and have value as products in commerce as taxable goods under the Uniform Commercial Code (see U.C.C. Article 2, Part 1).

A program is transferred into one or more memories of the computer or computer system from a data and information device or storage system. A computer system typically has a device for reading storage media that is used to transfer the program, and/or has an interface device that receives the program over a network. This process is discussed in the General Computer Explanation section.

The signifier 'commercial solution' signifies, solely for the following paragraph, an engineering domain-specific (and thus non-preemptive—see Bilski): electronic structure, a process for a specified machine, a manufacturable circuit (and their Church-Turing equivalents) or a composition of matter that applies science and/or technology in commerce to solve a technical problem.

The signifier 'abstract' (when used in a patent claim for any enabled embodiments disclosed herein for a new commercial solution that is a scientific use of one or more laws of nature {see Benson}, and that solves a problem of technology {see Diehr} used in commerce—or improves upon an existing commercial solution {see Diehr})—is precisely defined by the inventor(s) {see MPEP 2111.01 (9th edition, Rev. August 2017)} as follows:

a) a new commercial solution is 'abstract' if it is not novel (e.g., it is so well known in equal prior art {see Alice} and/or the use of equivalent prior art solutions is long prevalent {see Bilski} in science, engineering or commerce), and thus unpatentable under 35 U.S.C. 102, for example, because it is 'difficult to understand' {see Merriam-Webster definition for 'abstract'} how the commercial solution differs from equivalent prior art solutions; or b) a new commercial solution is 'abstract' if it is obvious, that is, if the existing prior art includes at least one analogous prior art solution {see KSR}, or the existing prior art includes at least two prior art publications that can be combined {see Alice} by a skilled person {often referred to as a 'PHOSITA', see MPEP 2141-2144 (9th edition, Rev. August 2017)} to be equivalent to the new commercial solution, and is thus unpatentable under 35 U.S.C. 103, for example, because it is 'difficult to understand' how the new commercial solution differs from a PHOSITA-combination/-application of the existing prior art; or c) a new commercial solution is 'abstract' if it is not disclosed with a description that enables its praxis, either because insufficient guidance exists in the description, or because only a generic implementation is described {see Mayo} with unspecified components, parameters or functionality, so that a PHOSITA is unable to instantiate an embodiment of the new solution for use in commerce, without, for example, requiring special programming {see Katz} (or, e.g., circuit design) to be performed by the PHOSITA, and is thus unpatentable under 35 U.S.C. 112, for example, because it is 'difficult to understand' how to use in commerce any embodiment of the new commercial solution.

The Detailed Description signifies in isolation the individual features, structures, functions, or characteristics described herein and any combination of two or more such features, structures, functions or characteristics, to the extent that such features, structures, functions or characteristics or combinations thereof are enabled by the Detailed Description as a whole in light of the knowledge and understanding of a skilled person, irrespective of whether such features, structures, functions or characteristics, or combinations thereof, solve any problems disclosed herein, and without limitation to the scope of the Claims of the patent. When an embodiment of a claimed invention comprises a particular feature, structure, function or characteristic, it is within the knowledge and understanding of a skilled person to use such feature, structure, function, or characteristic in connection with other embodiments whether or not explicitly described, for example, as a substitute for another feature, structure, function or characteristic.

In view of the Detailed Description, a skilled person will understand that many variations of the claimed inventions can be enabled, such as function and structure of elements, described herein while remaining in the domain of the claimed inventions. One or more elements of an embodiment can be substituted for one or more elements in another embodiment, as will be understood by a skilled person. Writings about embodiments signify their uses in commerce, thereby enabling other skilled people to similarly use in commerce.

This Detailed Description is fitly written to provide knowledge and understanding. It is neither exhaustive nor limiting of the precise structures described, but is to be accorded the widest scope consistent with the disclosed principles and features. A skilled person can enable many equivalent variations. Without limitation, any and all equivalents described, signified or Incorporated By Reference in this patent application are specifically Incorporated By Reference into the Detailed Description. In addition, any and all variations described, signified or Incorporated By Reference with respect to any one claimed invention and its embodiment also are included with all other claimed inventions and their embodiments. Any such variations include both currently known variations as well as future variations, for example any element used for enablement includes a future equivalent element that provides the same function, regardless of the structure of the future equivalent element.

It is intended that the domain of the set of claimed inventions and their embodiments be defined and judged by the following Claims and their equivalents. The Detailed Description includes the following Claims, with each Claim standing on its own as a separate claimed invention. The embodiments of the claimed inventions can have more structure and features than are explicitly specified in the Claims.

The foregoing embodiments have been presented for purposes of illustration and description. They are not intended to be exhaustive or to limit the scope of this disclosure to the forms disclosed. Accordingly, many modifications and variations will be apparent to practitioners skilled in the art. Additionally, the above disclosure is not intended to limit the disclosed subject matter. The scope of the claimed invention(s) is defined by the appended claims.

What is claimed is:

1. A non-transitory computer-readable medium comprising stored instructions, which when executed by a processor, cause the processor to:
convert a first integrated circuit (IC) design layout having in-design layers into a second IC design layout having derived layers, wherein said converting comprises mapping the in-design layers to the derived layers by applying a set of layer derivation rules to shapes in the first IC design layout, wherein the set of layer derivation rules implements a one-to-many mapping between the in-design layers and the derived layers, wherein each layer derivation rule includes a condition that must be satisfied by parameters of a given shape in the first IC design layout for the layer derivation rule to apply to the given shape, and wherein the condition includes one or more of: a first term that checks if the given shape is in an active or a non-active region, a second term that checks if the given shape is in an n-type or a p-type region, and a third term that checks if the given shape is covered by a recognition layer corresponding to a type of module;
generate a one-to-one mapping between the derived layers and process layers used in a parasitic extraction tool; and
perform parasitic extraction on the first IC design layout by providing the second IC design layout and the one-to-one mapping to the parasitic extraction tool.

2. The non-transitory computer-readable storage medium of claim 1, wherein the set of layer derivation rules are specified in a layer mapping file, and wherein said applying the set of layer derivation rules to the shapes in the first IC design layout comprises reading the layer mapping file.

3. The non-transitory computer-readable storage medium of claim 2, wherein said generating the one-to-one mapping between the derived layers and the process layers used in the parasitic extraction tool comprises creating a temporary file that contains a table that maps derived layers to corresponding process layers, and wherein said providing the one-to-one mapping to the parasitic extraction tool comprises providing the temporary file to the parasitic extraction tool.

4. The non-transitory computer-readable storage medium of claim 1, wherein the set of layer derivation rules are specified in a first section of a layer mapping file, and wherein said applying the set of layer derivation rules to the shapes in the first IC design layout comprises reading the layer mapping file, wherein generating the one-to-one mapping between the derived layers and the process layers used in the parasitic extraction tool comprises creating a second section in the layer mapping file that contains a table that maps derived layers to corresponding process layers, wherein said providing the one-to-one mapping to the parasitic extraction tool comprises providing the layer mapping file to the parasitic extraction tool, and wherein the first section of the layer mapping file includes a keyword that causes the parasitic extraction tool to ignore the first section of the layer mapping file.

5. The non-transitory computer-readable storage medium of claim 1, wherein each layer derivation rule further includes (1) an in-design layer identifier and (2) a process layer identifier.

6. The non-transitory computer-readable storage medium of claim 1, wherein the type of module is one of: an input/output module, a low voltage module, a high voltage module, or a memory module.

7. An apparatus, comprising:
a processor; and
a non-transitory computer-readable medium comprising stored instructions, which when executed by the processor, cause the processor to:
convert a first integrated circuit (IC) design layout having in-design layers into a second IC design layout having derived layers, wherein said converting comprises mapping the in-design layers to the derived layers by applying a set of layer derivation rules to shapes in the first IC design layout, and wherein the set of layer derivation rules implements a one-to-many mapping between the in-design layers and the derived layers, wherein each layer derivation rule includes a condition that must be satisfied by parameters of a given shape in the first IC design layout for the layer derivation rule to apply to the given shape, and wherein the condition includes one or more of: a first term that checks if the given shape is in an active or a non-active region, a second term that checks if the given shape is in an n-type or a p-type region, and a third term that checks if the given shape is covered by a recognition layer corresponding to a type of module;

generate a one-to-one mapping between the derived layers and process layers used in a parasitic extraction tool; and perform parasitic extraction on the first IC design layout by providing the second IC design layout and the one-to-one mapping to the parasitic extraction tool.

8. The apparatus of claim 7, wherein the set of layer derivation rules are specified in a layer mapping file, and wherein said applying the set of layer derivation rules to the shapes in the first IC design layout comprises reading the layer mapping file.

9. The apparatus of claim 8, wherein said generating the one-to-one mapping between the derived layers and the process layers used in the parasitic extraction tool comprises creating a temporary file that contains a table that maps derived layers to corresponding process layers, and wherein said providing the one-to-one mapping to the parasitic extraction tool comprises providing the temporary file to the parasitic extraction tool.

10. The apparatus of claim 7, wherein the set of layer derivation rules are specified in a first section of a layer mapping file, and wherein said applying the set of layer derivation rules to the shapes in the first IC design layout comprises reading the layer mapping file, wherein generating the one-to-one mapping between the derived layers and the process layers used in the parasitic extraction tool comprises creating a second section in the layer mapping file that contains a table that maps derived layers to corresponding process layers, wherein said providing the one-to-one mapping to the parasitic extraction tool comprises providing the layer mapping file to the parasitic extraction tool, and wherein the first section of the layer mapping file includes a keyword that causes the parasitic extraction tool to ignore the first section of the layer mapping file.

11. The apparatus of claim 7, wherein each layer derivation rule further includes (1) an in-design layer identifier and (2) a process layer identifier.

12. The apparatus of claim 7, wherein the type of module is one of: an input/output module, a low voltage module, a high voltage module, or a memory module.

13. A method for in-design parasitic extraction, the method comprising:

converting, by using a computer, a first integrated circuit (IC) design layout having in-design layers into a second IC design layout having derived layers, wherein said converting comprises mapping the in-design layers to the derived layers by applying a set of layer derivation rules to shapes in the first IC design layout, and wherein the set of layer derivation rules implements a one-to-many mapping between the in-design layers and the derived layers, wherein each layer derivation rule includes a condition that must be satisfied by parameters of a given shape in the first IC design layout for the layer derivation rule to apply to the given shape, and wherein the condition includes one or more of: a first term that checks if the given shape is in an active or a non-active region, a second term that checks if the given shape is in an n-type or a p-type region, and a third term that checks if the given shape is covered by a recognition layer corresponding to a type of module;

generating a one-to-one mapping between the derived layers and process layers used in a parasitic extraction tool; and performing parasitic extraction on the first IC design layout by providing the second IC design layout and the one-to-one mapping to the parasitic extraction tool.

14. The method of claim 13, wherein the set of layer derivation rules are specified in a layer mapping file, and wherein said applying the set of layer derivation rules to the shapes in the first IC design layout comprises reading the layer mapping file.

15. The method of claim 14, wherein said generating the one-to-one mapping between the derived layers and the process layers used in the parasitic extraction tool comprises creating a temporary file that contains a table that maps derived layers to corresponding process layers, and wherein said providing the one-to-one mapping to the parasitic extraction tool comprises providing the temporary file to the parasitic extraction tool.

16. The method of claim 13, wherein the set of layer derivation rules are specified in a first section of a layer mapping file, and wherein said applying the set of layer derivation rules to the shapes in the first IC design layout comprises reading the layer mapping file, wherein generating the one-to-one mapping between the derived layers and the process layers used in the parasitic extraction tool comprises creating a second section in the layer mapping file that contains a table that maps derived layers to corresponding process layers, wherein said providing the one-to-one mapping to the parasitic extraction tool comprises providing the layer mapping file to the parasitic extraction tool, and wherein the first section of the layer mapping file includes a keyword that causes the parasitic extraction tool to ignore the first section of the layer mapping file.

17. The method of claim 13, wherein each layer derivation rule further includes (1) an in-design layer identifier and (2) a process layer identifier.

18. The method of claim 13, wherein the type of module is one of: an input/output module, a low voltage module, a high voltage module, or a memory module.

* * * * *